United States Patent Office 3,702,888
Patented Nov. 14, 1972

3,702,888
MICACEOUS TELLURITES AND THE METHOD OF MAKING THEM
Michael J. Redman, Belmont, Mass., assignor to Kennecott Copper Corporation, New York, N.Y.
No Drawing. Filed Nov. 5, 1970, Ser. No. 87,337
Int. Cl. C01f 11/00; C01b 19/00
U.S. Cl. 423—508
10 Claims

ABSTRACT OF THE DISCLOSURE

Tellurites with the composition $MTe_2O_5$ where M is selected from cadmium, strontium, or calcium in the form of mica-like plates are provided.

The present invention relates to novel ternary compositions of matter. More particularly, it relates to novel mica-like materials which contain three elements, namely, tellurium, oxygen and an element selected from cadmium, strontium, and calcium. Still more particularly, the invention is concerned with compounds which possess the composition:

$$MTe_2O_5$$

where M is the element cadmium, strontium, or calcium. The invention is also concerned with the process of making the mica-like materials possessing the above composition.

The known micas are a series of silicate minerals characterized specifically by a perfect basal cleavage. They generally yield, with ease, thin tough laminas that have a high degree of flexibility. The various micas are structurally similar, although the chemical composition may vary widely, particularly in the rarer species. Both natural micas and synthetic micas are known. Muscovite, the most widely used mica in the electrical industry, has the chemical formula $K_2Al_4(Al_2Si_6O_{20})(OH)_4$. Phlogopite and biotite are other natural micas. Known synthetic micas include fluorophlogopite and barium disilicic.

The micas, both synthetic and natural, have found a variety of industrial and commercial uses. The higher qualities of block mica are used principally in the manufacture of electronic tubes, high temperature steam gauge glasses, and regulator diaphragms. Lower qualities of block mica are used as electrical insulation in household appliances, incandescent lamps, fuse plugs, and other electrical equipment. Film mica is used principally as a dielectric in capacitors, particularly for the electronic industry.

The novel compositions of matter of this invention will also find application in the aforementioned uses. However, because of the physical properties, particularly the optical properties and dielectric properties, the mica-like tellurites may find additional specialized application such as in window material for both visible and infrared light, high energy heavy-ion track detector and as substrate material in thin film work.

The reagents used in making the micaceous tellurites of this invention are tellurium dioxide and any compound containing cadmium, calcium or strontium that is capable of decomposing to the oxide at the melt temperature without reducing or oxidizing the tellurium IV. The preferred reagents are the carbonates of cadmium, calcium and strontium. Of course the oxides of strontium, cadmium and calcium may be used.

In the first step of the process of this invention the reagents are ground and mixed. It is preferred to use stoichiometric quantities, i.e., 2 mole equivalents of tellurium dioxide to 1 mole equivalent of the second reagent. The second reagent may be any compound containing oxygen and an element selected from cadmium, calcium or strontium capable of decomposing to the cadmium, calcium or strontium oxide at the melt temperature without changing the valence of the tellurium, or the oxide of cadmium, calcium or strontium. Up to about a 20% excess above the stoichiometric quantity of tellurium dioxide can be tolerated in the reaction and up to about 10% excess above stoichiometric quantity of the second reagent can be tolerated. If an excess of one of the reagents is used the excess of that reagent appears between the plate-like layers of the compound. This excess can be mechanically removed or can be removed by using a dilute mineral acid. For many commercial or industrial applications the excess of any reagent will not have to be removed from the micaceous compounds.

After the tellurium dioxide and the second reagent, i.e., the compound containing cadmium, calcium, or strontium capable of decomposing to the respective oxide at the melt temperature without reducing or oxidizing the tellurium IV or the oxide of cadmium, calcium or strontium, are mixed, the mixture is heated to a temperature of preferably not more than 100° C. above the melting point. The reaction may proceed at as little as 10 to 20° C. above the melting point but the preferable operating temperature is about 50° above the melting point. This temperature gives a good fluidity to the melt and assures intimate mixing and a complete reaction. All that is necessary is that the temperature is enough above the melting point to give good dissolution and reaction. However, the temperature should not be so high as to cause loss of the reagents through volatile losses.

The melt is then held at a temperature of from about 10 to 100° C. above the melting point for a period of time up to 12 hours or more to provide a complete reaction. Generally a period of time from about 1 to 4 hours is sufficient to complete the reaction.

After remaining at the reaction temperature for the selected period of time the melt is cooled at a rate of from about 1 to 20° C. per hour and preferably from about 4 to 8° C. per hour through the melting point to give the mica-like composition of matter.

EXAMPLE 1

This example illustrates the preparation of a composition of matter possessing the composition $CdTe_2O_5$. Cadmium oxide and tellurium dioxide are weighed out in stoichiometric amounts, i.e., 1:2 molar ratio, ground, mixed together and melted in a platinum crucible at 750° C. in an electric furnace. The melt was kept at 750° C. for about 3 hours and then the furnace temperature was dropped at a rate of 4 to 8° C. per hour through the melting point of 670° to about 600° C. at which temperature the furnace power was turned off. After cooling in the furnace to room temperature, the platinum crucible was removed from the furnace. The resulting material exhibited a mass of $CdTe_2O_5$ plates. The melting point of $CdTe_2O_5$ is about 670° C. Other physical properties are indicated in Tables I and II below.

Analysis of the $CdTe_2O_5$

| Cadmium (wt. percent) | Tellurium (wt. percent) | $TeO_3$ (wt. percent) |
|---|---|---|
| 25.07 | 57.07 | Not detected. |
| 25.13 | 57.00 | Do. |
| 25.09 | 57.00 | Do. |
| (25.11) | (57.02) | (Calcd. for $CdTe_2O_5$). |

EXAMPLE 2

The preparation of $SrTe_2O_5$ is illustrated by this example. One molar equivalent of strontium carbonate and two molar equivalents of tellurium dioxide are ground and mixed. The mixture is placed in an electric furnace in a platinum crucible and heated to about 750° C. and held at this temperature for about 3 hours. The furnace temperature was then dropped at a rate between 4 to 8° C. per hour to about 600° C. and the furnace power turned off. After cooling to room temperature in the furnace, micaceous $SrTe_2O_5$ was removed. The melting point of $SrTe_2O_5$ was 680° C. Other physical properties are given in Tables I and II below.

EXAMPLE 3

$CaTe_2O_5$ was prepared by grinding and mixing stoichiometric quantities of calcium carbonate and tellurium dioxide, heating the mixture in a platinum crucible in an electric furnace to a temperature of about 850° C. and holding at this temperature for about 3 hours. The furnace was then cooled at a rate of from about 4 to 8° C. per hour until a furnace temperature of about 700° C. had been reached and the furnace power shut off. The plate-like $CaTe_2O_5$ compound was removed from the furnace after cooling down to room temperature. The melting point of $CaTe_2O_5$ was about 792° C. Other physical properties are shown in Tables I and II below.

TABLE I.—MELTING POINTS, DENSITIES AND SUB-CELL PARAMETERS OF MICA-LIKE TELLURITES [1]

| Physical quantity | $CdTe_2O_5$ | $CaTe_2O_5$ | $SrTe_2O_5$ |
|---|---|---|---|
| Melting point (° C.) | 670 (5) | 792 (5) | 680 (5) |
| Meas. density (g./cm.³) | 6.2 (2) | 5.1 (2) | 4.6 (2) |
| $a_s$ (A.) | 6.81 (1) | 6.90 (1) | |
| $b_s$ (A.) | 3.840 (6) | 3.860 (6) | |
| $c_s$ (A.) | 9.85 (1) | 9.94 (1) | |
| $\beta_s$ (deg.) | 115.2 (1) | 115.9 (1) | |
| Sub-cell volume (A.³) | 233.1 | 238.2 | |
| Calc. density (g./cm.³) | 6.38 | 5.23 | |

[1] Estimated errors in the least significant figures are given in parentheses.

The dielectric properties were measured at temperatures of 25° C. and 95° C. by means of a three terminal capacitance bridge covering a frequency range of 100 Hz. to 10 kHz. The samples studied were in the form of thin sheets approximately 0.005–0.01 cm. thick, upon which circular silver electrodes were evaporated. The D.C. resistivity was measured with a Keithley electrometer.

The micaceous-like materials of this invention are optically biaxial (—), with an optic axial angle of $2V \simeq 30°$ for $CdTe_2O_5$ and with the lowest index $n\alpha$ perpendicular to the cleavage plane. The refractive indices of the compounds, as determined by the liquid immersion method, were found to be greater than 2. The index of refraction of $CdTe_2O_5$ normal to the cleavage plane as determined by ellipsometry using the 5461 A Hg line is $2.58 \pm 0.03$. This index of refraction is very high as compared to that for mica which ranges from 1.55 to 1.61.

Table III lists the indexed powder patterns for the forward reflection regions of the isomorphous tellurites in terms of both the true cells and the sub-cells, the intensities being estimated visually from films. From these interplanar spacings, the dimensions of the sub-cells of $CaTe_2O_5$ and $CdTe_2O_5$ have been calculated and are given in Table I above, together with the measured and calculated densities.

TABLE III.—X-RAY DIFFRACTION POWDER DATA FOR MICA-LIKE TELLURITES

| True cell HKL | Sub-cell hkl | $CdTe_2O_5$ d(A.) | I | $CaTe_2O_5$ d(A.) | I | $SrTe_2O_5$[a] d(A.) | I |
|---|---|---|---|---|---|---|---|
| 002 | 001 | 8.9 | 5 | 8.9 | 10 | 9.0 | 1 |
| 022 | | 7.3 | 5 | 7.4 | 2 | | |
| 1̄21 | | 6.1 | 3 | | | | |
| 004 | 002 | 4.43 | 20 | 4.45 | 50 | 4.48 | 40 |
| 2̄02 | 2̄01 | | | 3.41 | 1 | 3.44 | 2 |
| 1̄72 | 1̄11 | 3.301 | 5 | | | | |
| 2̄04 | 2̄02 | } 3.225 | 5 | 3.287 | 20 | 3.318 | 2 |
| 170 | 110 | | | | | | |
| 200 | 200 | 3.083 | 15 | 3.101 | 15 | 3.134 | 10 |
| 1̄82 | | } 3.005 | 3 | | | 3.051 | 1 |
| 1̄81 | | | | | | | |
| 006 | 003 | } 2.956 | 100 | 2.975 | 100 | 3.001 | 100 |
| 1̄74 | 1̄12 | | | | | | |
| 172 | 111 | 2.858 | 10 | 2.866 | 10 | 2.911 | 5 |
| 2̄06 | 2̄03 | 2.815 | 10 | | | 2.880 | 5 |
| 202 | 201 | | | 2.602 | 2 | | |
| 1̄76 | 1̄13 | | | 2.512 | 5 | | |
| 174 | 112 | 2.384 | 15 | 2.399 | 10 | 2.502 | 5 |
| 2̄08 | 2̄04 | 2.339 | 3 | | | 2.398 | 5 |
| 008 | 004 | 2.221 | 5 | | | 2.173 | 1 |
| 1̄78 | 1̄14 | 2.065 | 5 | 2.082 | 2 | 2.105 | 2 |
| 176 | 113 | 1.983 | 2 | 1.994 | 5 | 2.023 | 3 |
| 3̄74 | 3̄12 | 1.955 | 20 | 1.975 | 10 | 2.007 | 3 |
| 3̄72 | 3̄11 | } 1.919 | 15 | 1.939 | 5 | 1.984 | 2 |
| 0.14.0 | 020 | | | | | | |
| 3̄82 | | | | 1.843 | 2 | 1.867 | 3 |
| 370 | 310 | 1.808 | 1 | 1.823 | 2 | | |
| 206 | 203 | 1.794 | 20 | | | 1.816 | 20 |
| 0.0.10 | 005 | 1.777 | 3 | 1.790 | 15 | 1.806 | 20 |
| 1̄.7.10 | 1̄15 | 1.736 | 30 | 1.740 | 15 | 1.749 | 10 |
| 4̄04 | 4̄02 | } 1.701 | 5 | 1.713 | 3 | | |
| 4̄06 | 4̄03 | | | | | | |
| 178 | 114 | } 1.674 | 5 | | | | |
| 2̄.14.2 | 2̄21 | | | | | | |
| 3̄72 | 3̄11 | } 1.660 | 5 | 1.674 | 5 | 1.677 | 15 |
| 2̄.14.4 | 2̄22 | | | | | | |
| 4̄02 | 4̄01 | } 1.634 | 10 | 1.647 | 5 | 1.651 | 3 |
| 4̄08+ | 4̄04+ | | | | | | |
| 0.14.6 | 023 | } 1.610 | 15 | 1.626 | 10 | 1.636 | 5 |
| 3̄.7.10 | 3̄15 | | | | | | |
| 2̄.14.6 | 2̄23 | 1.590 | 5 | 1.604 | 2 | 1.617 | 1 |
| 2.14.2 | 221 | } 1.545 | 5 | 1.553 | 3 | | |
| 400 | 400 | | | | | | |
| 374 | 312 | 1.496 | 2 | | | | |
| 0.0.12 | 006 | } 1.485 | 15 | 1.490 | 10 | 1.506 | 20 |
| 2.14.8+ | 224+ | | | | | | |
| 1.7.10 | 115 | } 1.435 | 15 | 1.439 | 10 | { 1.483 / 1.437 | 10 / 10 } |
| 2.14.4 | 222 | | | | | | |
| 4̄.0.12 | 4̄06 | } 1.407 | 5 | 1.416 | 2 | { 1.383 / 1.348 | 3 / 1 } |
| 2̄.0.14 | 2̄07 | | | | | | |
| 2̄.14.10 | 2̄25 | | | 1.379 | 2 | | |
| 376 | 313 | 1.352 | 3 | 1.344 | 3 | | |
| 2.0.10 | 205 | } 1.312 | 10 | 1.318 | 5 | { 1.330 / 1.323 | 2 / 2 } |
| 2.14.6+ | 223+ | | | | | | |

[a] The indices do not apply to $SrTe_2O_5$.

TABLE II.—DIELECTRIC PROPERTIES OF MICACEOUS TELLURITES

| Material | Temp., °C. | Dielectric constant 1 kHz. | Dielectric constant 10 kHz. | Loss tangent (tan δ) 1 kHz. | Loss tangent (tan δ) 10 kHz. | AC resistivity ρ (10¹⁰Ω-cm.) 1 kHz. | AC resistivity ρ (10¹⁰Ω-cm.) 10 kHz. |
|---|---|---|---|---|---|---|---|
| $CdTe_2O_5$ | 25 | 10.22 | 10.22 | 0.0013 | 0.00096 | 13.96 | 1.7 |
| | 95 | 10.60 | 10.57 | 0.0019 | 0.0012 | 0.86 | 0.14 |
| $SrTe_2O_5$ | 25 | 9.84 | 9.83 | 0.00073 | 0.0004 | 25.4 | 4.5 |
| | 95 | 9.82 | 9.81 | 0.0022 | 0.0015 | 8.5 | 1.2 |
| $CaTe_2O_5$ | 25 | 11.45 | 11.45 | 0.00026 | 0.00017 | 72 | 11 |
| | 95 | 11.36 | 11.34 | 0.0024 | 0.0007 | 6.7 | 2.4 |
| Mica (muscovite) | 25 | 7.77 | 7.77 | 0.00078 | 0.0003 | 29 | 7.44 |

What I claim is:

1. Tellurites in the form of mica-like plates having the composition of $MTe_2O_5$ wherein M is selected from cadmium, strontium and calcium.

2. A tellurite in the form of mica-like plates having the composition $CdTe_2O_5$.

3. A tellurite in the form of mica-like plates having the composition $SrTe_2O_5$.

4. A tellurite in the form of mica-like plates having the composition $CaTe_2O_5$.

5. The process of making mica-like tellurites having the formula:

$$MTe_2O_5$$

wherein M is selected from cadmium, strontium and calcium comprising the steps of grinding and mixing tellurium dioxide and a compound selected from the oxides and carbonates of calcium, cadmium and strontium, heating the mixture to a temperature of from about 10 to about 100° C. above the melting point of the mixture whereby a melt containing the reaction product of tellurium dioxide and an oxide selected from calcium oxide, cadmium oxide and strontium oxide is formed, holding the melt at a temperature of from about 10 to about 100° C. above the melting point for a period of time of at least one hour and cooling the melt at a rate of from about 1 to 20° C. per hour through the melting point whereby plate-like micaceous tellurites are formed.

6. The process of claim 5 wherein the compound is selected from calcium carbonate, cadmium carbonate and strontium carbonate.

7. The process of claim 5 wherein the tellurium dioxide and the compound are mixed in stoichiometric amounts.

8. The process of claim 5 wherein the tellurium dioxide is mixed with a compound selected from calcium oxide, cadmium oxide, and strontium oxide.

9. The process of claim 5 wherein the mixture is heated to a temperature about 25 to 75° C. above the melting point of the mixture.

10. The process of claim 9 wherein the melt is held at about 50° C. above the melting point of the mixture for a period of time from about 1 to 4 hours and the melt is cooled at a rate of from about 4 to 8° C. per hour through the melting point.

References Cited

UNITED STATES PATENTS

| | | | |
|---|---|---|---|
| 3,309,168 | 3/1967 | Bayer | 23—50 R |
| 3,309,169 | 3/1967 | Bayer | 23—50 R |

OTHER REFERENCES

Rocchiccioli, "Comptes rendus," vol. 247, 1958, pp. 1108–1110.

Rocchiccioli, "Comptes rendus," vol. 250, 1960, pp. 2347–2349.

HERBERT T. CARTER, Primary Examiner